United States Patent [19]

Matsuda

[11] Patent Number: 5,113,796
[45] Date of Patent: May 19, 1992

[54] FEEDER

[75] Inventor: Takumi Matsuda, Tokyo, Japan

[73] Assignee: Seikosha Co., Ltd., Japan

[21] Appl. No.: 492,634

[22] Filed: Mar. 13, 1990

[30] Foreign Application Priority Data

Mar. 14, 1989 [JP] Japan .................................. 1-61486

[51] Int. Cl.⁵ ............................................. A01K 5/02
[52] U.S. Cl. .................................................. 119/51.11
[58] Field of Search .............. 119/51.11, 51.15, 51.01, 119/51.04, 51.14, 56.1

[56] References Cited

U.S. PATENT DOCUMENTS

| 3,605,697 | 9/1971 | Szekely | 119/51.11 |
| 3,741,162 | 6/1973 | Lopez | 119/51.5 X |
| 3,762,373 | 10/1973 | Grossman | 119/51.11 |
| 4,279,221 | 7/1981 | Arvizu | 119/51.11 |
| 4,735,171 | 4/1988 | Essex | 119/51.5 X |
| 4,771,734 | 9/1988 | Blicher | 119/51.11 |
| 4,981,106 | 1/1991 | Nagatomo | 119/51.11 |

FOREIGN PATENT DOCUMENTS 2166934 5/1986 United Kingdom ............ 119/51.11

Primary Examiner—Gene Mancene
Assistant Examiner—Thomas Price
Attorney, Agent, or Firm—Bruce L. Adams; Van C. Wilks

[57] ABSTRACT

A feeder for supplying fish food has a container for storing food which is dispensed at desired times by rotating the container through one revolution. The container is rotatably mounted on a housing having a rotary dial containing time indicia. A manually turnable lug is mounted on the housing and coacts with the time indicia on the dial to indicate time. One or more pins are detachably connected to the dial to set predetermined times at which the food is to be automatically dispensed. As each pin rotates past the lug, a motor is turned on to rotate the container one revolution to thereby dispense a given amount of food at the predetermined time. The time-indicating lug may be manually turned to turn the motor on in order to dispense food at any desired time.

5 Claims, 3 Drawing Sheets

FEEDER

BACKGROUND OF THE INVENTION

The present invention relates to a feeder for supplying a given amount of food to goldfish and tropical fish at predetermined times.

Some types of food for goldfish and tropical fish are formed into granules and must be supplied in given amounts (at predetermined times.) It is cumbersome to take food out of a food box and supply it (at each of the predetermined times, and there is the problem that a mistaken amount of food may be supplied or feeding may be forgotten. In the worst case, the fish will die if food cannot be supplied for long periods.

To solve the foregoing problems, applicant has previously proposed an apparatus which enables feeding at predetermined times (Japanese Utility Model Application No. 77021/1988). This apparatus is so designed that a given amount of food is discharged from a food container which is caused to rotate by a driving motor which is started at times set in a timer.

It is sometimes necessary to supply food to goldfish and tropical fish at determined times every day, as desired above, as well as at desired times determined to be necessary in accordance with the growth of the goldfish and the season.

SUMMARY OF THE INVENTION

Accordingly, it is an object of the present invention to provide a feeder which enables food to be discharged from a food container at a predetermined time, as well as any desired time, so as to cope with such needs.

The present invention is characterized by a set pin set in the outer periphery of a dial which is caused to rotate at a given speed, and a switch which is switched by a cam shaft caused to rotate through a given angle each time it engages with the set pin so that a given amount of granular food can be discharged from a food container caused to rotate by a rotational driving means operated by the switch. A lug provided at the end of the cam shaft is disposed at a position that indicates the present time on time scales of the dial on the front side of a frame body and which can be manually rotated to allow actuation of the switch.

DETAILED DESCRIPTION OF THE INVENTION

An embodiment of the present invention is described in below with reference to the drawings.

Figure 1:
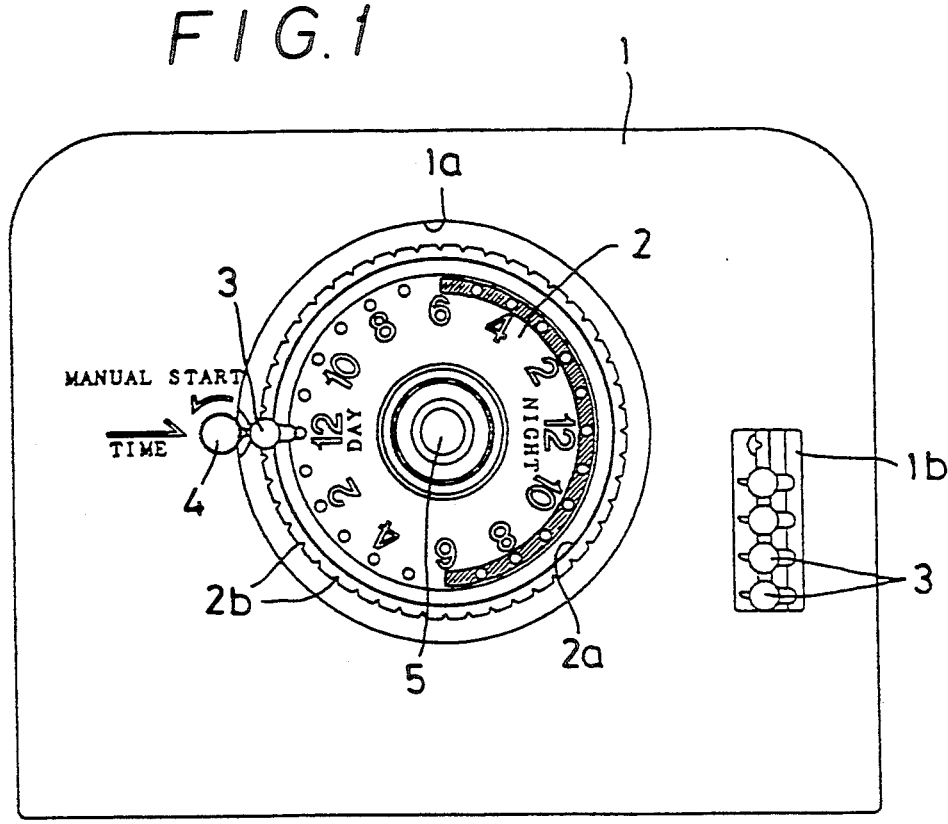
FIG. 1 is a front view of one embodiment of feeder according to the present invention.

In FIG. 1, a circular concave portion 1a is formed in the central portion of the front of a frame body 1 and has a dial 2 rotatably dispose therein and which is caused to rotate through one rotation every 24 hours by a timer mechanism (described below). Time indicia, such as time scales of 24 hours, are indicated on the surface of the dial 2. A groove portion 2a is formed along the outer periphery of the time scales of the dial 2, and 48 engagement grooves 2b are axially formed at intervals of 30 minutes on the peripheral side surface of the dial 2. A set pin 3 is set on the dial 2 is arranged to releaseably engage with the groove portion 2a and each of the engagement grooves 2b so as to set a predetermined feed time. A plurality of feed times can be set by using a plurality of set pins 3, and the unused pins 3 can be held by being engaged in a holding groove 1b formed on the right side of the front of the frame body 1 as viewed in the drawing.

A time-indicating member in the form of a manually turnable lug 4 is provided adjacent to the concave portion 1a on the front of the frame body 1. The turnable lug 4 is disposed at a position which indicates the present time on the time scales of the dial 2; in FIG. 1 the present time is shown as noon. At the center of the dial 2 is provided a lug 5 used for correcting time.

Figure 2:
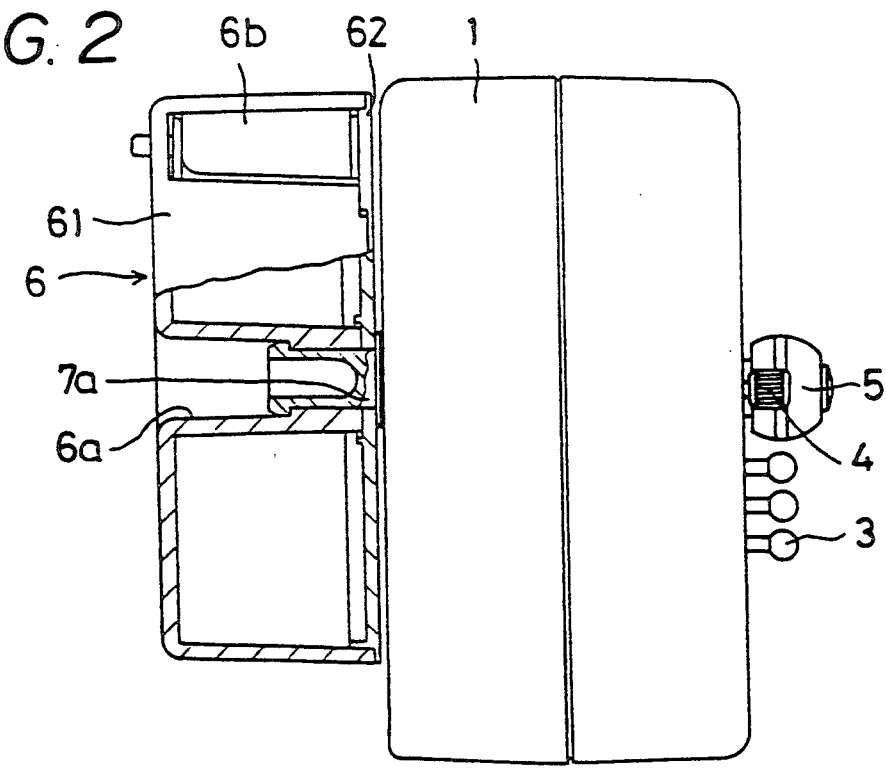
FIG. 2 is a partially cut-away left side view of a food container.

As shown in FIG. 2, a food container 6 which is caused to rotate at each of the predetermined times is rotatably mounted on the back of the frame body 1.

The food container is detachably coupled in a snap fitting method with a forked driving shaft 7a having engagement claws at the end, outwardly projected from the frame body 1.

Figure 3:
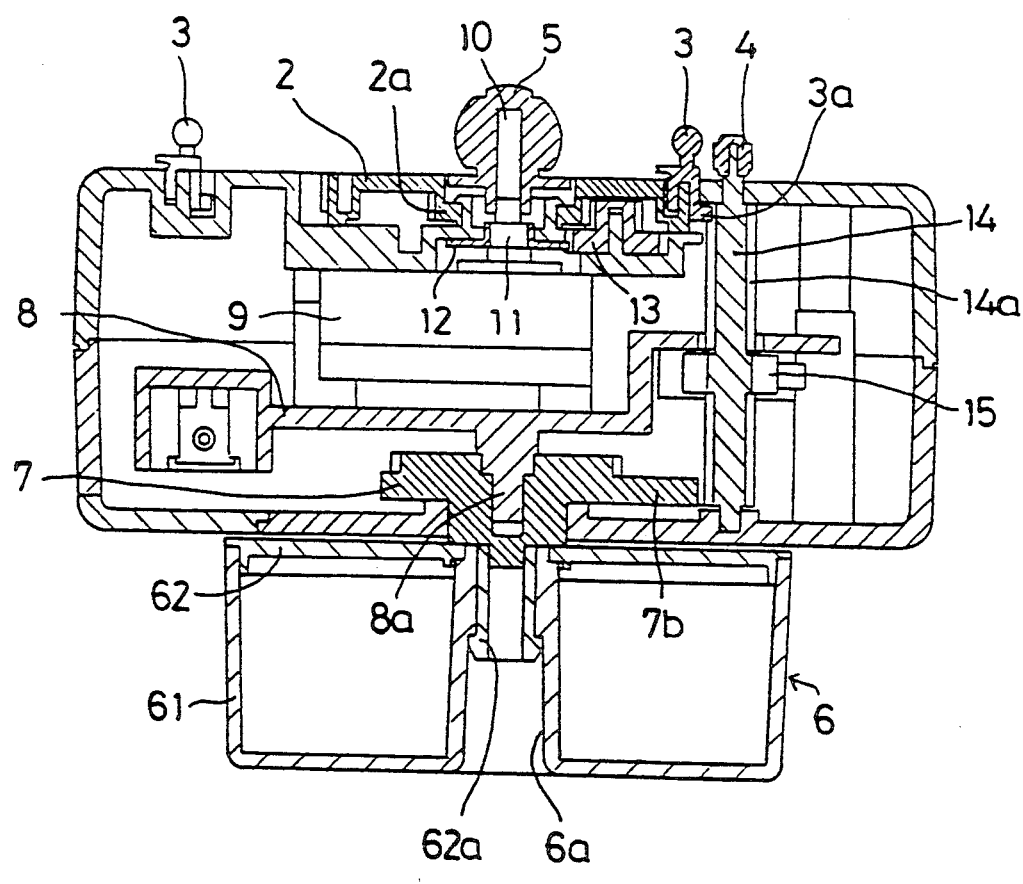
FIG. 3 is a horizontal sectional view.

The food container 6 comprises a container 61 and a cover 62, as shown in FIG. 3. A forked engagement arm 62a is formed integrally with the cover 62 and has engagement claws which engage in a snap fitting manner with an engagement step portion formed in an engagement hole 6a which is opened at the center of the container 61. A food outlet 6b is provided in a portion of the side surface of the food container 6, as shown in FIG. 2, so that a given amount of granular food (not shown in the drawing) contained in the food container 6 may be discharged from the outlet 6b each time the food container 6 rotates one turn.

A description will now be made of the structure of the frame body 1.

In FIG. 3, a rotating gear wheel 7 is formed integrally with a driving shaft 7a (see FIG. 2) of the food container 6 and is rotatably supported by a shaft 8a integrally formed so as to project from the center of an intermediate plate 8 in the backward direction (the downward direction as viewed in the drawing). A clock machine member 9 is fitted on the front of the intermediate plate 8.

A minute hand shaft 10 and an hour hand shaft 11 are coaxially projected from the front of the clock machine member 9, the above-mentioned lug 5 for correcting time being press fitted on the end of the minute hand shaft 10. A second hour hand wheel 12 is secured on the hour hand shaft 11 and engages with a gear 13, and a pinion 13a which is integrally formed with the gear 13 engages with a gear 2c which is integrally formed on the back of the dial 2. The dial 2 is thus caused to rotate through one rotation every 24 vhours.

Figure 4:
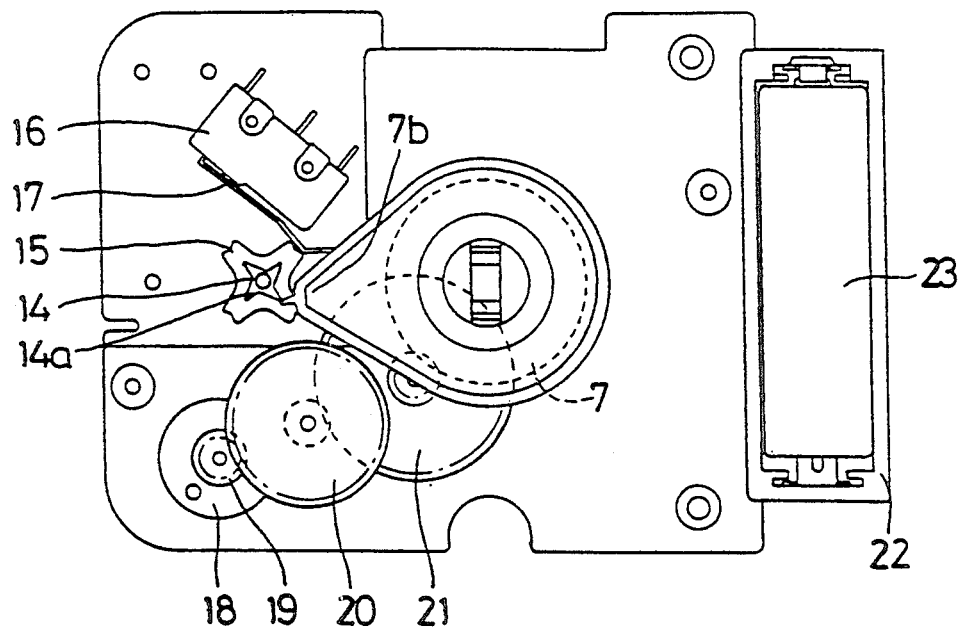
FIG. 4 is a plane view of a rotational driving means for the food container.

A claw 3a of the set pin 3 set on the dial 2 engages with the cam shaft 14 on which a lug 4 is secured and causes the cam shaft 14 to rotate through a given angle each time it engages therewith. FIG. 4 shows a typical arrangement for this engagement. In the drawing, four claws 14a ... are formed in the axial direction at radial intervals of 90 degrees. The claw 3a of the set pin 3 can be engaged with each of the claws 14a. The cam shaft 14 is caused to rotate through a given angle (for example, 45 degrees) each time the claw 3a of the set pin 3 engages with each of the claws 14a of the cam shaft 14.

As shown in FIG. 4, cams 15 are also provided on the cam shaft 14 at intervals of 90 degrees, which is the same angle as that of the claws 14a, and the cams 15 are positioned in phase with the cams 14. Each of the cams 15 slidably contacts a movable armature 17 of a micro switch 16. In the state shown in FIG. 4, the switch 16 is in an off state and is switched to an on state when the armature 17 is placed in the concave portion of each of the cams 15.

When the switch 16 is turned on, a driving motor 18 is started. The rotational driving force generated by a pinion 19 of the motor 18 is transmitted through a train of reduction gears 20, 21 to the gear 7 which is thus caused to rotate. A projecting portion 7b is integrally formed with the gear 7 and has a claw at its end capable of engaging with each of the claws 14a of the cam shaft 14. As shown in FIG. 4, a battery 23 is accommodated in a battery receiving chamber 22.

A description will now be given of the operation of the present invention.

The function of automatically supplying food to goldfish at a set time every day is described below using as an example the state shown in FIG. 1 wherein only one set pin 3 is positioned at the position representing noon on the dial 2. In use, the feeder is mounted on a water tank such that the food container 6 is located above the water so that rotation of the food container through one revolution causes the food to discharge from the feed outlet 6b into the water.

Although the dial 2 is caused to rotate at a given speed in the clockwise direction as viewed in FIG. 1, the claw 3a of the set pin 3 set on the dial 2 engages with one of the claws 14a of the cam shaft 14 so as to cause the cam shaft 14 to rotate through a given angle (for example, 45 degrees).

Consequently, the cams 15 rotate at the same time as the cam shaft 14 so that when the end of the armature 17 of the micro switch 16 enters one of the concave portions of the cams 15, the switch 16 is turned on. The motor 18 is therefore started, and the gear 7 is also caused to rotate while interlocking with the gear 18, whereby rotation of the food container 6 through one cycle of rotation is started.

When the gear 7 has rotated through one cycle of rotation, the end of the projecting portion 7b engages with one of the claws 14a of the cam shaft 14 to cause the claws to rotate, whereby the end of one of the cams 15 presses against the armature 17 of the micro switch 16 which is thus turned off. The rotation of the motor 18 is thus stopped, and the rotation of the food container 6 is also stopped.

At the final stage during one rotation of the food container 6, a given amount of the granular food contained in the container 6 is discharged downward from the food outlet 6b.

Consequently, food is discharged to a water tank at a given time every day. As a matter of course, a plurality of times can be set by setting a plurality of set pins 3.

A description will now be given of the case in which food is supplied manually.

In FIG. 1, if the lug 4 is held with the finger tips and caused to rotate in the counterclockwise direction, as described above, the cams 15 rotate so that the armature 17 of the switch 16 enters one of the concave portions of the cams 15. The switch 16 is thus turned on, and the food container 6 is caused to rotate in the same manner as described above so that a given amount of food is discharged from the food outlet 6b. The other functions are the same as those described above.

Correction of time is performed by rotating the time correcting lug 5.

The above-mentioned arrangement of the present invention enables granular food to be automatically supplied not only at a set time but also at other desired times, and involves no need for the provision of a mark indicating the present time at another position because the lug provided at the end of the cam shaft is disposed at the position indicating the present time on the time scales of the dial on the front of the frame body and there is no need for an additional space for setting and indication mark.

I claim:

1. A feeder for supplying food automatically at predetermined times each day or manually at any desired time, comprising: a housing; a rotary dial rotatably mounted on the housing and having time indicia thereon; means for rotating the dial as a function of time; a turnable time-indicating member manually turnably mounted on the housing adjacent to the rotary dial and coacting with the time indicia on the rotating dial to indicate time; a food container rotatably mounted on the housing for containing a supply of food during use of the feeder, the food container having an opening through which a given amount of the food is discharged during each rotation of the container; drive means operative when energized to rotate the container through one cycle of rotation; means for automatically energizing the drive means at one or more predetermined times each day; and means responsive to manual turning of the time-indicating member for energizing the drive means at any desired time.

2. A feeder according to claim 1; wherein the means for automatically energizing the drive means comprises switch means switchable between on and off states to energize and deenergize the drive means, one or more pins detachably connected to the dial for rotation therewith and cooperative with the time indicia to set the one or more predetermined times, and means engageable with each pin as it rotates past the time-indicating member for switching the switching means to the on state.

3. A feeder according to claim 2; wherein the means engageable with each pin comprises a rotary cam shaft having a plurality of circumferentially spaced first cams, each pin engaging with one of the cams at the predetermined time set by that pin to rotationally drive the cam shaft through a given angle, and means responsive to rotation of the cam shaft through the given angle for switching the switching means to the on state.

4. A feeder according to claim 3; wherein the means responsive to manual turning of the time-indicating member for energizing the drive means at any desired time comprises means connecting the time-indicating member to the rotary cam shaft whereby manual turning of the time-indicating member effects rotation of the cam shaft through the given angle to thereby switch the switching means to the on state.

5. A feeder according to claim 4; wherein the means responsive to rotation of the cam shaft through the given angle for switching the switching means to the on state comprises a plurality of circumferentially spaced second cams carried by the cam shaft and having the same phase as the first cams, the second cams successively engaging with the switching means each time the cam shaft rotates through the given angle to switch on the switching means.

* * * * *